(12) United States Patent
Hillis et al.

(10) Patent No.: US 7,701,439 B2
(45) Date of Patent: *Apr. 20, 2010

(54) GESTURE RECOGNITION SIMULATION SYSTEM AND METHOD

(75) Inventors: William Daniel Hillis, Encino, CA (US); H Keith Nishihara, Los Altos, CA (US); Shi-Ping Hsu, Pasadena, CA (US); Neil Siegel, Rolling Hills Estates, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 950 days.

This patent is subject to a terminal disclaimer.

(21) Appl. No.: 11/485,790

(22) Filed: Jul. 13, 2006

(65) Prior Publication Data

US 2008/0013793 A1   Jan. 17, 2008

(51) Int. Cl.
*G06K 9/00* (2006.01)
(52) U.S. Cl. .................... 345/156; 715/856; 382/154; 382/103
(58) Field of Classification Search ............... 345/156; 715/856; 382/154, 103
See application file for complete search history.

(56) References Cited

U.S. PATENT DOCUMENTS

| | | | |
|---|---|---|---|
| 5,913,727 A | 6/1999 | Ahdoot | |
| 5,999,185 A | 12/1999 | Kato et al. | |
| 6,147,678 A * | 11/2000 | Kumar et al. | 345/158 |
| 6,195,104 B1 | 2/2001 | Lyons | |
| 6,222,465 B1 * | 4/2001 | Kumar et al. | 341/20 |
| 6,434,255 B1 * | 8/2002 | Harakawa | 382/103 |
| 6,624,833 B1 * | 9/2003 | Kumar et al. | 715/863 |
| 6,695,770 B1 | 2/2004 | Choy et al. | |
| 6,714,901 B1 | 3/2004 | Cotin et al. | |
| 6,796,656 B1 * | 9/2004 | Dadourian | 353/28 |
| 6,806,849 B2 | 10/2004 | Sullivan | |

(Continued)

OTHER PUBLICATIONS

Korida, K et al: "*An Interactive 3D Interface for a Virtual Ceramic Art Work Environment*"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.

(Continued)

*Primary Examiner*—Bipin Shalwala
*Assistant Examiner*—Afroza Y Chowdhury
(74) *Attorney, Agent, or Firm*—Tarolli, Sundheim, Covell & Tummino LLP

(57) ABSTRACT

A gesture recognition simulation system and method is provided. In one embodiment, a gesture recognition simulation system includes a three-dimensional display system that displays a three-dimensional image of at least one simulated object having at least one functional component. A gesture recognition interface system is configured to receive an input gesture associated with a sensorless input object from a user. The gesture recognition simulation system further comprises a simulation application controller configured to match a given input gesture with a predefined action associated with the at least one functional component. The simulation application controller could invoke the three dimensional display system to display a simulated action on at least a portion of the at least one simulated object associated an input gesture and a predefined action match.

27 Claims, 7 Drawing Sheets

U.S. PATENT DOCUMENTS

| | | | | |
|---|---|---|---|---|
| 2001/0006426 | A1* | 7/2001 | Son et al. | 359/15 |
| 2002/0093666 | A1* | 7/2002 | Foote et al. | 356/621 |
| 2004/0046747 | A1* | 3/2004 | Bustamante | 345/173 |
| 2005/0002074 | A1 | 1/2005 | McPheters et al. | |
| 2005/0052714 | A1 | 3/2005 | Klug et al. | |
| 2005/0088714 | A1* | 4/2005 | Kremen | 359/28 |
| 2005/0275628 | A1* | 12/2005 | Balakrishnan et al. | 345/156 |
| 2005/0286101 | A1* | 12/2005 | Garner et al. | 359/9 |
| 2006/0010400 | A1* | 1/2006 | Dehlin et al. | 715/856 |
| 2006/0125799 | A1* | 6/2006 | Hillis et al. | 345/173 |
| 2006/0187196 | A1* | 8/2006 | Underkoffler et al. | 345/156 |
| 2006/0203363 | A1* | 9/2006 | Levy-Rosenthal | 359/858 |
| 2006/0209021 | A1* | 9/2006 | Yoo et al. | 345/156 |
| 2008/0013826 | A1* | 1/2008 | Hillis et al. | 382/154 |
| 2009/0103780 | A1* | 4/2009 | Nishihara et al. | 382/103 |
| 2009/0115721 | A1* | 5/2009 | Aull et al. | 345/156 |

OTHER PUBLICATIONS

Sato, Y et al.: "*Real-Time Input of 3D Pose and Gestures of a User's Hand and Its Applications for HCI*"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.

Plesniak, W et al.: "*Spatial Interaction with Haptic Hologram*"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.

Fiorentino, M et al.: "*Spacedesign: A Mixed Reality Workspace for Aesthetic Industrial Design*"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.

European Search Report for corresponding EP 07 25 2717 completed Sep. 27, 2007 by Martin Müller of the EPO.

* cited by examiner

GESTURE RECOGNITION SIMULATION SYSTEM AND METHOD

CROSS REFERENCE TO RELATED APPLICATIONS

The present application is related to U.S. Patent Application entitled "Gesture Recognition Interface System", filed concurrently with the Present application Ser. No. 11/485,788, assigned to the same assignee as the present application and incorporated herein by reference in its entirety.

TECHNICAL FIELD

The present invention relates generally to interface systems, and specifically to a gesture recognition simulation system and method.

BACKGROUND

New and innovative ways to provide an interface to a computer are often developed to complement changes in computer applications. For example, touch sensitive screens can allow a user to provide inputs to a computer without a mouse and/or a keyboard, such that desk area is not needed to operate the computer. However, these types of computer interfaces can only provide information to the computer regarding the touch event, itself, and thus can be limited in application. As another example, three-dimensional computer interfaces allow a given user to interact with a computer in three-dimensional space. An example of a three-dimensional computer interface that allows for gesture and free-space control of a computer is a virtual reality interface. However, virtual reality computer interface systems require a user to wear special equipment, such as an instrumented glove and/or headset. Such equipment can be cumbersome, and at a given time, provides control and interface capability only for the given user that is wearing the equipment.

SUMMARY

One embodiment of the present invention may include a gesture recognition simulation system. The gesture recognition simulation system comprises a three-dimensional display system that displays a three-dimensional image of at least one simulated object having at least one functional component. The gesture recognition simulation system also comprises a gesture recognition interface system configured to receive an input gesture associated with a sensorless input object from a user. The input gesture could be determined by changes in at least one of a three-dimensional shape and a physical location of the sensorless input object relative to the at least one functional component. The gesture recognition simulation system further comprises a simulation application controller configured to match a given input gesture with a predefined action associated with the at least one functional component. The simulation application controller could invoke the three dimensional display system to display a simulated action on at least a portion of the at least one simulated object associated with the at least one functional component.

Another embodiment of the present invention includes a method for interacting with a simulated device. The method may comprise generating a three-dimensional image of at least one simulated object having at least one functional component. The method may also comprise illuminating a background surface with a plurality of light sources, generating a first plurality of images associated with a sensorless input object based on a reflected light contrast between the sensorless input object and the illuminated background surface caused by one of the plurality of light sources, and generating a second plurality of images associated with the sensorless input object based on a reflected light contrast between the sensorless input object and the illuminated background surface caused by another one of the plurality of light sources. The method may also comprise determining changes in at least one of a three-dimensional shape and a physical location of the sensorless input object based on a comparison of corresponding images of the first and second plurality of images. The method may also comprise determining an input gesture associated with the sensorless input object based on changes in at least one of a three-dimensional shape and a physical location of the sensorless input object relative to the at least one functional component. The method may also comprise determining if the input gesture matches a predefined action associated with the at least one functional component. The method may further comprise displaying a simulated action associated with a matched predefined action on at least a portion of the at least one simulated object associated with the at least one functional component.

Another embodiment of the present invention includes a gesture recognition simulation system. The gesture recognition simulation system may comprise means for displaying a three-dimensional image of at least one simulated device having at least one functional component. The gesture recognition system may comprise means for generating a first plurality of images associated with a sensorless input object based on a reflected light contrast between the sensorless input object and an illuminated background surface caused by a first light source, means for generating a second plurality of images associated with the sensorless input object based on a reflected light contrast between the sensorless input object and the illuminated background surface caused by a second light source, and means for determining changes in at least one of a three-dimensional shape and a physical location of the sensorless input object based on a comparison of corresponding images of the first and second plurality of images. The gesture recognition system may further comprise means for determining an input gesture associated with the sensorless input object based on the determined changes, means for matching the input gesture to a predefined action associated with the at least one functional component and a physical location of the input gesture relative to the at least one functional component, and means for displaying a simulated action on at least a portion of the at least one simulated object, the simulated action being associated with the matching of a predefined action to an associated input gesture.

DETAILED DESCRIPTION

Figure 1:
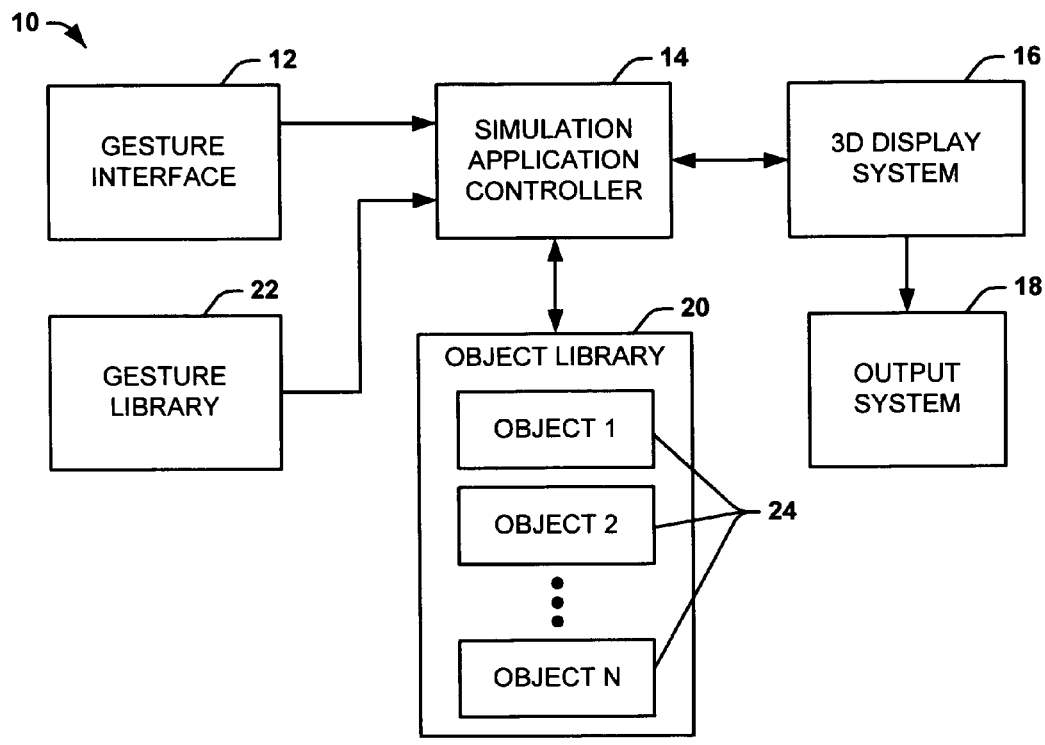
FIG. 1 illustrates an example of a block diagram of a gesture recognition simulation system in accordance with an aspect of the invention.

The present invention relates generally to interface systems, and specifically to a gesture recognition simulation system. A three-dimensional display system can display a three-dimensional image of a simulated object having one or more functional components. The three-dimensional image of the simulated object can be any of a variety of things with which people can interact, with the functional components providing the basis for the interaction. A functional component is defined as a portion of the simulated object in which simulated interaction can be performed, such that a gesture performed at or near a location of the functional component can cause an automatic rendering of a simulated action on at least the portion of the simulated object. The simulated action can, for example, include removing, moving, compressing, stretching and assembling the portion of the simulated object. Additionally, the simulated action can, for example, include moving, rotating, compressing or stretching of the entire simulated object. For example, a functional component can be assigned to individual movable parts, such that one or more simulated action can be performed on the movable parts based on associated gestures. Additionally, a functional component can be assigned to portions of a body of the simulated object not having movable parts, such that one or more simulated action can be performed on the entire simulated object based on associated gestures.

By defining a simulated object having at least one functional component, any of a variety of simulation applications can be implemented. For example, the three-dimensional image of the simulated object could be a person's head on which a simulated haircut can be performed, an engine that can be simulated to be assembled and/or disassembled, or a musical instrument upon which a user can simulate a performance. As another example, the three-dimensional image of the simulated object can be a simulated control panel of an actual remotely located machine or device, such that the machine or device can be remotely controlled by the user on the simulated display.

One or more users employ one or more sensorless input objects to provide input gestures at a gesture interface system. The gesture interface system could be, for example, located directly at the three-dimensional image of the simulated object, such that the user can interact directly with the simulated object. The sensorless input object could be, for example, one or more users' hands, a tool, and/or a simulated tool that is reactive to the one or more users' hands. The gesture interface system could include a plurality of infrared (IR) light sources that are configured to illuminate the sensorless input object and the background surface behind the sensorless input object to generate a plurality of images of the sensorless input object. The plurality of images could be, for example, a plurality of silhouettes of the sensorless input object.

A simulation application controller can be configured to match an input gesture with one or more predefined actions corresponding to the input gesture. For example, a user could provide gestures that include changes in a three-dimensional shape and/or physical location of the sensorless input object. The simulation application controller could determine the gesture corresponding to the changes in the three-dimensional shape and/or physical location of the sensorless input object and match the determined input gesture with the one or more predefined actions. The simulation application controller can then display a simulated action that corresponds to a predefined action for which the user provided the input gesture. For example, the user can provide a hand gesture to turn a simulated screwdriver directly at an image of a simulated screw on the three-dimensional image of the simulated object, and thus the simulated screw on the three-dimensional image of the simulated object can be displayed as being screwed or unscrewed as the user performs the gesture.

FIG. 1 illustrates an example of a block diagram of a gesture recognition simulation system 10 in accordance with an aspect of the invention. The gesture recognition simulation system 10 includes a gesture interface system 12. The gesture interface system 12 generates data regarding input gestures associated with a sensorless input object. For example, a user can provide hand gestures that are associated with predefined actions. It is to be understood that the input object can be sensorless, such that the gesture interface system 12 can interpret the gesture without the use of sensors to track shape and/or motion of the input object, as will be described in greater detail below with reference to FIGS. 5-7. For example, the user need not wear a special glove or use special tools to perform the input gestures, but can instead use his or her naked hand and/or use ordinary tools to perform the input gestures. As an example, the gesture interface system 12 could illuminate a retroreflective background surface to generate a plurality of silhouette images of the sensorless input object to determine changes in three-dimensional shape and physical location of the sensorless input object. The gesture interface system 12 can also be configured to determine gestures associated with multiple users, multiple hands from one or more users, and/or tools held by one or more users, either sequentially or concurrently.

The data output from the gesture interface system 12 is input to a simulation application controller 14. The simulation application controller 14 can be, for example, a standalone computer system or can be contained in one or more embedded processors. The simulation application controller 14 can interpret the input gestures associated with the sensorless input objects and match the input gestures to predefined actions to be performed on a simulated object. As described above, the simulated object can be any of a variety of objects with which a user can interact. In the example of FIG. 1, the simulation application controller 14 can output data associated with the simulated object to a three-dimensional display system 16. The three-dimensional display system 16 can generate a three-dimensional image of the simulated object. For example, the three-dimensional display system 16 can be a holograph projector, such that the three-dimensional image of the simulated object is a holographic image. As another example, the three-dimensional display system 16 can be a three-dimensional display screen, such that the user(s) can wear goggles or other eyewear to be capable of viewing the display screen in three-dimensions.

The gesture interface system 12 and the three-dimensional display system 16 can be integrated together, such that the user performs the input gestures using the sensorless input object(s) directly on functional components of the three-dimensional image of the simulated object. For example, the functional components of a given simulated object can include movable parts, removable parts, buttons, keys, or any of a variety of sub-parts of the simulated object with which the user(s) can interact. Therefore, a given user can perform an input gesture at the gesture interface system 12, the simulation application controller 14 can match the input gesture to a predefined action that is associated with a functional component of the simulated object, and the three-dimensional display system 16 can output a simulated action corresponding to the predefined action on the functional component of the three-dimensional image of the simulated object. As a result, the three-dimensional image of the simulated object can change in response to the input gesture based on the simulated action that is performed on the functional component of the simulated object. In addition, the three-dimensional display system 16 can also display images of simulated tools, such that the user can use his or her hands to interact with the simulated tools and the functional components of the three-dimensional display of the simulated object can be reactive to the simulated tools. Furthermore, the three-dimensional display system 16 can include sensors or other feedback devices to supply information back to the simulation application controller 14, such as alarms, position sensors, any of a variety of other feedback devices.

The following are examples of applications that can be simulated using the gesture recognition simulation system 10 for the purpose of illustrating the versatility of the gesture recognition simulation system 10. The simulated object could be a piano, with keys being functional components, such that a user can use his or her unencumbered fingers to simulate playing Beethoven. The simulated object could be a person's head, with hair being a functional component, such that a user can perform a simulated haircut on a three-dimensional image of a person's head using gestures associated with real scissors, with a three-dimensional image of simulated scissors, or with scissor motions of the user's index and middle fingers. The simulated object could be a bomb in a briefcase, with the briefcase cover and wires within being functional components, such that a user can open the briefcase and cut wires within to safely dismantle and disarm the simulated bomb by cutting specific wires using gestures associated with real or simulated wire-cutters. The simulated object can be a control panel of an actual machine in a hazardous environment, with buttons and switches being the functional components, such that the real machine can be safely operated from a distance based on the user performing gestures to push simulated buttons and to manipulate simulated switches. It is to be understood that the gesture recognition simulation system 10 is not intended to be limited to these examples, but that an almost infinite number of simulated objects with which a user can interact can be used for simulations for learning, training, and/or operating devices.

The gesture recognition simulation system 10 can also include an output system 18 coupled to the three-dimensional display system 16. The output system 18 can be configured to produce outputs in response to simulated actions, sequences, or gestures. For example, the output system 18 can generate audio signals to provide an audible component to the simulated actions, to provide instructions, and/or to signal error messages to a user. The output system 18 can also generate video signals for similar purposes, such as to demonstrate instructions for a "next sequence" on a video monitor in a training simulation. Furthermore, the output system 18 could generate control signals, such as wirelessly, through a wired network, and/or to access the Internet, such that devices can be signaled or controlled remotely from the gesture recognition simulation system 10.

The simulation application controller 14 can also be coupled to an object library 20 and/or a gesture library 22. The object library 20 can be configured to store data associated with a plurality of different objects 24, demonstrated in the example of FIG. 1 as Object 1 through Object N, where N is a positive integer. Each of the objects 24 can represent data for a different simulated object for use in the gesture recognition simulation system 10. For example, at the simulation application controller 14, a given user desiring to run a simulation can enter a request to display a given simulated object on which the user wishes to run the simulation. The simulation application controller 14 can access the object library 20 and obtain the object 24 that includes the data pertinent to the simulation. For example, the data accessed by the simulation application controller 14 from the object library 20 can include three-dimensional display data corresponding to the simulated object, functional component data, data associated with predefined actions that correspond to each of the functional components, and interaction data on respective simulated actions to be displayed as part of the three-dimensional display data.

In addition to the data pertaining to the simulated object, the object library 20 could contain gesture information data for each gesture that corresponds to each of the predefined actions for each of the functional components of the simulated object. Additionally or alternatively, upon accessing data corresponding to the predefined actions for each of the functional components of the simulated object, the simulation application controller 14 could access the gesture library 22 to access predefined gestures associated with the predefined actions for the functional components of the given simulated object.

The gesture library 22 could also include a variety of universal gestures that can be accessed by the simulation application controller 14. For example, simple gestures such as pointing (e.g., as a laser pointer), selecting, moving, rotating, zooming, and environment adjustment commands can also be included in the gesture library 22 and accessed by the simulation application controller 14. As yet another example, because a pointed finger can be interpreted as a one-dimensional ray in three-dimensional space, multiple fingertips can be implemented as a gesture to define a wedge, a cone, a prism, or any of a variety of shapes in three-dimensional space for selection of one or more functional components of a given simulated object. Thus, multiple wedges or cones from both hands or from hands of multiple users can also be employed to further define other simulated actions in three-dimensional space, such as scaling, moving, selecting, or any of a variety of other gestures. Such gestures could be applicable to any simulated object stored in the object library 20, and not just those that are specific to a given set of functional components for a particular simulated object. In addition, the gesture library 22 could be programmable to include additional gestures. For example, the gesture library 22 could allow a user to download additional gestures and corresponding actions into the gesture library 22. Furthermore, the gesture library 22 could also be coupled to the gesture interface system 12, such that additional gestures can be programmed into the gesture library 22 by a given user performing the new gestures at the gesture interface system 12 and downloading the resultant gesture data and corresponding action into the gesture library 22.

It is to be understood that the gesture recognition simulation system 10 in the example of FIG. 1 is not intended to limited to that illustrated in FIG. 1. For example, the gesture recognition simulation system 10 could operate without an object library 20 or a gesture library 22, such that it is specific to only one application. Alternatively, the gesture recognition simulation system 10 could also be included in a much larger assembly, such that it is part of an entire factory assembly line or control station or is part of a networked collaborative system for multiple users at remote locations to all participate in a given simulation. In addition, the gesture recognition simulation system 10 could be integrated together as a solid assembly, or contained in two or more separate components. Furthermore, as indicated above, an almost infinite variety of interactive simulations can be performed by the gesture recognition simulation system 10, and as such, the gesture recognition simulation system 10 is not intended to be limited by the above examples.

Figure 2:
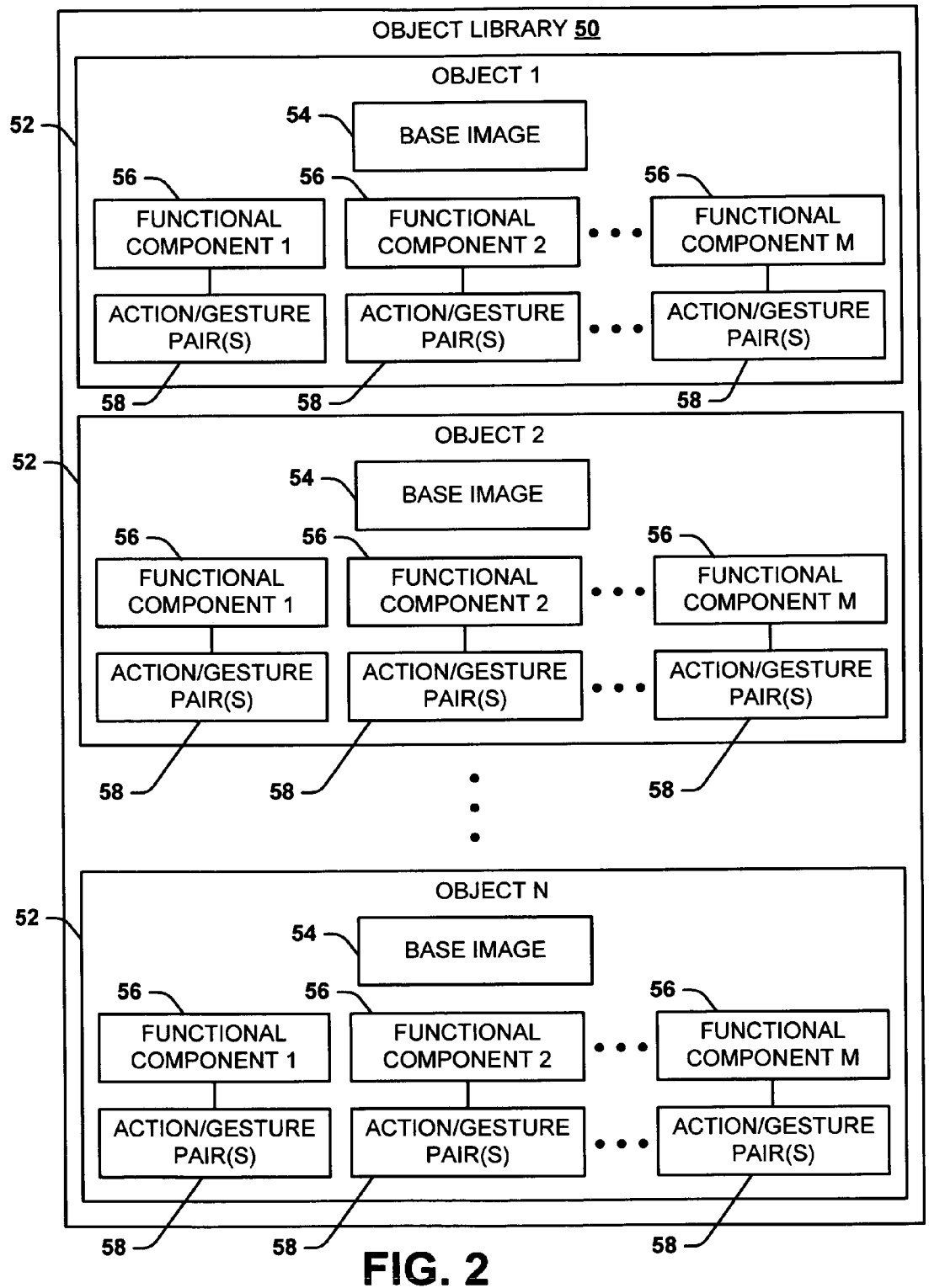
FIG. 2 illustrates an example of an object library of a gesture recognition simulation system in accordance with an aspect of the invention.

FIG. 2 illustrates an example of an object library 50 of a gesture recognition simulation system (not shown) in accordance with an aspect of the invention. For example, the object library 50 could be similar to the object library 20 in the above described example of FIG. 1. The object library can be configured to store data associated with a plurality of different objects 52, demonstrated in the example of FIG. 2 as Object 1 through Object N, where N is a positive integer. Each of the objects 52 can represent data for different, and possibly unrelated, simulated objects for use in a given gesture recognition simulation system. For example, Object 1 can include data associated with a simulated oboe on which the user can simulate playing music, while Object 2 can include data associated with a sign-language translation training tool for the user to gesture sign language to an image of a simulated deaf person. To access a given one of the objects 52, for example, a given user desiring to run a simulation can enter a request to display a given simulated object on which the user wishes to run the simulation. A simulation application controller (not shown) can access the object library 50 and obtain the data pertinent to the desired simulation.

Each of the objects 52 in the object library 50 includes a base image 54. The base image 54 can include three-dimensional image information associated with the simulated object for which the data in the object 52 pertains. The image information in the base image 54 could be transmitted to a three-dimensional display system (not shown). The three-dimensional display system could then output a three-dimensional image of the simulated object to which the object 52 pertains, thus allowing a user to visually interact with the three-dimensional image of the simulated object.

Each of the objects 52 in the object library 50 also includes a plurality of functional components 56, demonstrated in the example of FIG. 2 as Functional Component 1 through Functional Component M, where M is a positive integer. The functional components 56 of a given simulated object can be portions of the simulated object with which a given user interacts in the simulation. It is to be understood that, although each of the objects 52 are demonstrated in the example of FIG. 2 as having M functional components 56, each of the objects 52 may not have the same number of functional components 56, but could each have a different number of functional components 56 depending on the complexity of the simulated object to which the given object 52 pertains.

For example, Object 1 could include data associated with a firearm, such that it has only two functional components (e.g., a handle and a trigger), while Object 2 could include data associated with an automobile engine, such that it has hundreds of functional components. In addition, it is to be understood that the functional components 56 of a given simulated object can be dynamic, such that they can change in appearance or function through the performance of predefined actions based on input gestures. In addition, some of the functional components 56 may be interconnecting or composite, such that they can be merged or separated from other functional components 56. For example, in a simulated object that is an electrical junction box, four screws can each be separate functional components 56 that attach a cover plate, which can be yet another functional component 56, to the electrical junction box. As such, a given one of the functional components 56 can be dependent on the state of other functional components 56 in the given object 52.

Each of the functional components 56 includes at least one action/gesture pair 58. The action/gesture pairs 58 each represent a predefined action and corresponding input gesture with which the user can interact with the functional component 56. Simple functional components 56 could have, for example, a single action/gesture pair 58, such as squeezing a trigger or pushing a button. Other functional components 56 could have more than one action/gesture pair 58, such as a screw which can be screwed, unscrewed, or moved in free space. As another example, composite functional components 56, such as described above, could have many action/gesture pairs 58, and could even have additional functional components 56 that are structured beneath a given action/gesture pair 58, such that the additional functional components 56 are not accessible until a given predefined action is first performed.

The gesture components of each action/gesture pair 58 could be included specifically for each object 52 in the object library 50. Alternatively, as described above in the example of FIG. 1, the object library 50 may only store predefined actions associated with functional components 56, such that a simulation application controller accesses a gesture library to obtain the corresponding gestures associated with the predefined actions. As another alternative, the object library 50 may include data indicative of the appropriate gestures corresponding to the predefined actions for each functional component that is needed for a given simulation. Accordingly, a simulation application controller could use the data to access the gesture library and automatically obtain the appropriate gestures for use in the simulation.

Figure 3:
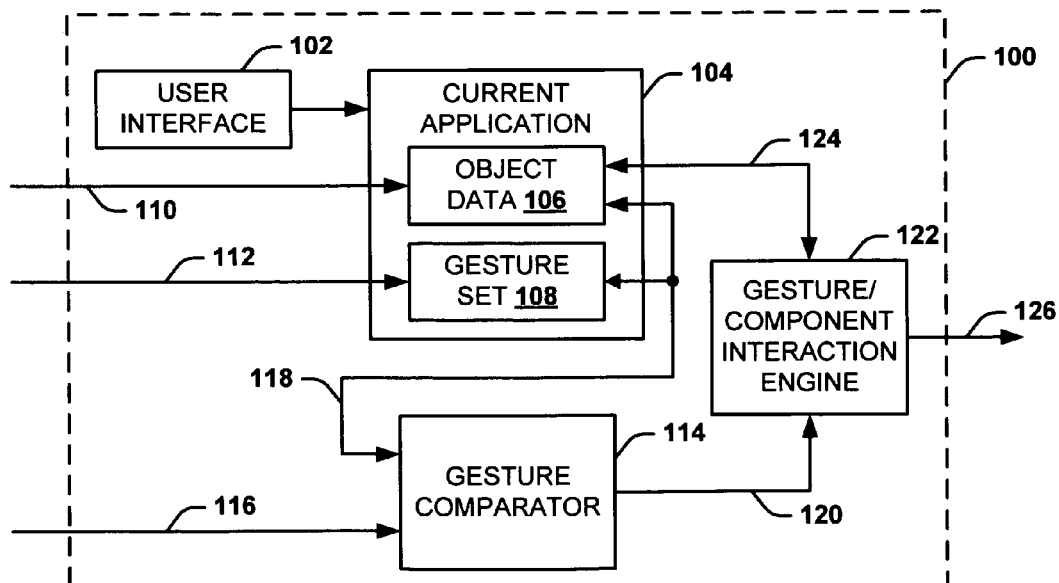
FIG. 3 illustrates an example of a simulation application controller of a gesture recognition simulation system in accordance with an aspect of the invention.

FIG. 3 illustrates an example of a simulation application controller 100 of a gesture recognition simulation system (not shown) in accordance with an aspect of the invention. For example, the simulation application controller 100 could be similar to the simulation application controller 14 in the above described example of FIG. 1. The simulation application controller 100 can include a user interface 102 and a current application memory 104. The user interface 102 can simply be an interface to allow a given user to operate the given gesture recognition simulation system in which the simulation application controller 100 is included. For example, the user interface 102 can be a computer terminal, a network connection, or simple pushbuttons.

The current application memory 104 can be configured to store data pertaining to a given interactive simulation for which the user desires to run. As an example, using the user interface 102, the user can load data associated with a given simulated object and all associated gestures, demonstrated in the example of FIG. 3 as object data 106 and gesture set 108, into the current application memory 104. Upon issuing the command, the simulation application controller 100 can access the appropriate object data 106, such as from an object library (not shown). For example, the simulation application controller 100 can employ a data line 110, which could be a wired or wireless connection, to communicate with an object library and upload the object data 106 into the current application memory 104. Alternatively, the current application memory 104 could include data associated with a number of simulated objects, or the simulation application controller 100 could have an internal object library.

Upon the current application memory 104 receiving the object data 106, the simulation application controller 100 could determine which gestures are needed to perform a simulation using the object data 106. For example, data associated with a simulated object in the object data 106 could include a number of functional components. Each of the functional components could have a number of associated action/gesture pairs, which could be predefined actions associated with the functional component, as well as the associated input gestures. The simulation application controller 100 could access a gesture library (not shown) via a data line 112, which could be wired or wireless, to upload the appropriate gesture set 108 that includes the input gestures that correspond to each predefined action associated with each functional component of the simulated object in the object data 106. The gesture set 108 can also include one or more universal gestures that are appropriate for any simulated object, and not just specific to the simulated object of the object data 106. The universal gestures could also be accessed from a gesture library, or they could be included in the current application memory 104 or in a separate memory in the simulation application controller 100.

The simulation application controller 100 includes a gesture comparator 114. The gesture comparator 114 receives gesture data 116, such as from a gesture interface system (not shown). The gesture data 116 could be data that merely demonstrates movements, shapes, and/or position corresponding to a given input gesture associated with a sensorless input object, such that the gesture comparator 114 interprets the gesture data 116 to translate the gesture data 116 to a corresponding input gesture. Alternatively, the gesture data 116 could be a signal that is indicative of a determined gesture, including movements, shapes, and/or position corresponding to a given input gesture associated with a sensorless input object, such that a definitive gesture was already translated from an input gesture at, for example, the gesture interface system. The gesture comparator 114 then compares the gesture data 116 with the gestures contained in the gesture set 108, indicated by a comparison signal 118, to determine if the gesture data 116 matches any of the gestures contained in the gesture set 108. In addition, the gesture comparator 114 can also compare position information, such as position of a sensorless input object, to the object data 106 to determine an appropriate functional component of the simulated object for which the input gesture is intended.

Upon matching the gesture data 116 to a gesture within the gesture set 108, the gesture comparator 114 outputs gesture information 120 to a gesture/component interaction engine 122. The gesture/component interaction engine 122 also receives functional component data 124 associated with the appropriate function component as dictated by the physical location of the sensorless input object from the object data 106. For example, the functional component data 124 could include all predefined actions that are associated with the given functional component. The gesture/component interaction engine 122 could receive the functional component data 124 from the object data 106 based on the comparison signal 118 commanding the object data 106 to transmit the functional component data 124 to the gesture/component interaction engine 122. Alternatively, the gesture/component interaction engine 122 could receive physical location information of the sensorless input object from the gesture information 120, such that the gesture/component interaction engine 122 polls the object data 106 for the functional component data 124.

The gesture/component interaction engine 122 is configured to combine the functional component data 124 with the gesture information 120. For example, the functional component data 124 could include predefined actions associated with a screw, such as screwing, unscrewing, and movement of the screw in free space. The gesture information 120 could be a gesture associated with screwing the screw using a screwing motion with the user's hand, such as with a simulated screwdriver. The gesture/component interaction engine 122 thus combines the data and outputs simulated action data 126, which could be image data corresponding to the turning of a screw. The simulated action data 126 could be output to a three-dimensional display system (not shown), such that the three-dimensional display system demonstrates the functional component, the screw, turning relative to the simulated object. The gesture/component interaction engine 122 could also ensure that the simulated action data 126 is inclusive of data demonstrative of interaction with other functional components, or that the simulated action data 126 is not output unless the functional components are appropriately combined. For example, the gesture/component interaction engine 122 may not output the simulated action data 126 of the turning of the screw unless the screw is positioned relative to another functional component (e.g., a threaded aperture).

It is to be understood that the example of FIG. 3 is a simplified illustration of a simulation application controller 100, and as such is not intended to be limited to the example of FIG. 3. For example, a number of additional components could be required for adequate operation of the simulation application controller 100. In addition, as indicated above, the interaction of the components in the simulation application controller 100 can also vary based on design considerations and other application based factors.

Figure 4:
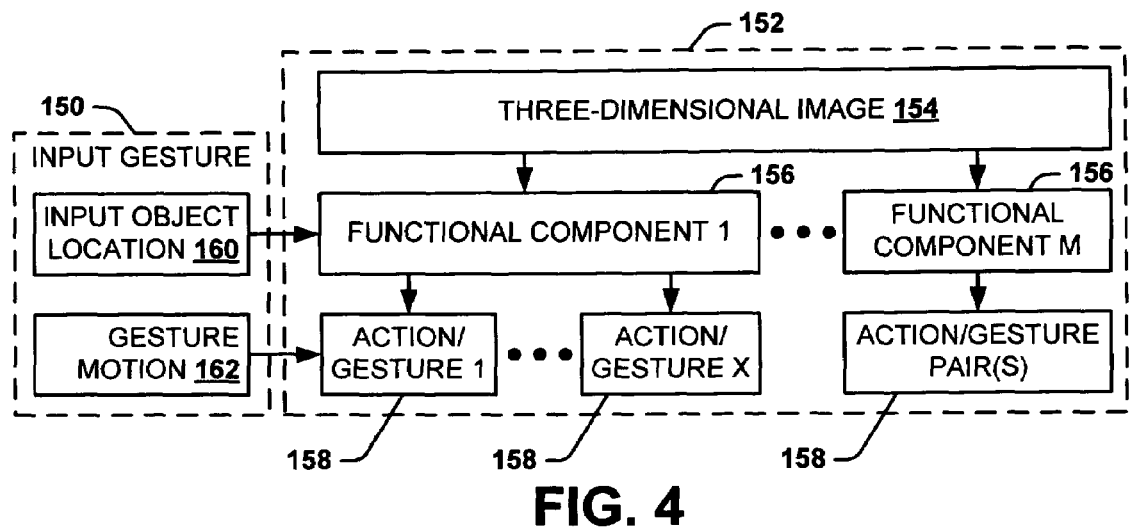
FIG. 4 illustrates an example of interaction between an input gesture and a simulated object in a gesture recognition simulation system in accordance with an aspect of the invention.

FIG. 4 illustrates an example of interaction between an input gesture 150 and a simulated object 152 in a gesture recognition simulation system in accordance with an aspect of the invention. The simulated object 152 can be an object 52 in the object library 50 in the example of FIG. 2. Specifically, the simulated object 152 includes a three-dimensional image 154, which could be output from a three-dimensional display system to allow a user to visually interact with the three-dimensional image 154 of the simulated object 152. The three-dimensional image 154 has a plurality of functional components 156 associated with it, demonstrated in the example of FIG. 4 as Functional Component 1 through Functional Component M, where M is a positive integer. The functional components 156 can be portions of the three-dimensional image 154 of the simulated object 152 with which a given user can interact.

Each of the functional components 156 includes at least one action/gesture pair 158. The action/gesture pairs 158 each represent a predefined action and corresponding input gesture with which the user can interact with the given functional component 156. In the example of FIG. 4, Functional Component 1 includes a number X of action/gesture pairs 158, where X is a positive integer. Similar to that described above in the example of FIG. 2, the functional components 156 can each have a different number of associated action/gesture pairs 158. As also indicated in the above example of FIG. 2, one or more of the functional components 156 can be interconnecting or composite functional components, such that they can be merged or separated from other functional components 156. As such, a given one of the functional components 156 can be dependent on the state of other functional components 156 in the simulated object 150, and can thus have additional functional components 156 that are structured beneath a given action/gesture pair 158.

The input gesture 150 includes an input object location component 160 and a gesture motion component 162. The input object location component 160 can represent a physical location of a sensorless input object in three-dimensional space. As will be better described below in the examples of FIGS. 5-9, the physical location of the sensorless input object in three-dimensional space can be determined by a gesture interface system, such as the gesture interface system 12 in the above described example of FIG. 1. For example, the input object location component 160 can include information regarding a physical location of a user's hand, and can further include physical location information regarding fingertips and/or other features of the user's hand. In addition, the input object location component 160 can also include physical location information regarding a real or a simulated tool that is held in the user's hand. The gesture motion component 162 can include information regarding the actual gesture that is associated with the input object. For example, the gesture motion component 162 can be information regarding the gesture that corresponds to a given gesture in an action/gesture pair 158, such as a gesture indicating the turning of a screwdriver.

In a given simulation, a simulation application controller (not shown) determines which portion of the simulated object 150 a user desires to interact. The example of FIG. 4 demonstrates that the input object location component 160 of the input gesture 150 can be interactive with a given one of the functional components 156. For example, the simulation application controller can determine to which functional component 156 the user is providing the input gesture 150 based on the input object location component 160. The simulated application controller, upon determining that the input object location component 160 and the physical location of the functional component 156 in three-dimensional space correspond with each other, can determine if the gesture motion component 162 corresponds with an appropriate one of the action/gesture pairs 158. If the gesture motion component 158 corresponds with one of the action/gesture pairs 158, the user has performed an appropriate gesture. The simulation application controller thus instructs the three-dimensional display system to modify the three-dimensional image 154 to display the resultant simulated action corresponding to the predefined action of the action/gesture pair 158.

For example, a user wishes to unscrew a simulated screw from a control panel. The simulated screw is therefore a functional component 156 (e.g., Functional Component 1). The user could move his or her sensorless input object (e.g., screwdriver, real or simulated) to the physical location in three-dimensional space where the simulated screw is located and could perform the unscrewing gesture. The simulation application controller can compare the physical location of the screwdriver tip with the physical location of the simulated screw. Upon a correlation of the physical locations, the simulation application controller can determine that the user is performing the unscrewing gesture, which could match an appropriate action/gesture pair 158 of Functional Component 1. In response, the simulation application controller can command the three-dimensional display system to display the simulated screw being unscrewed from the control panel.

It is to be understood that FIG. 4 is but one example of the manner in which input gestures can interact with a given simulated object. As such, FIG. 4 is not intended to be limited by the above described interaction. For example, instead of utilizing an input object location component 160 of an input gesture 150, a simulation application controller could utilize a separate gesture that selects a given functional component. For example, a user could simply touch or point to a given functional component 156 to select it, then perform the appropriate gesture at any of variety of locations in three-dimensional space, such that gestures need not necessarily be location specific. Alternatively, a simulation application controller could receive a separate input altogether, such as from a computer, to select a given functional component upon which a gesture can be performed at a variety of different locations. Therefore, an input gesture 150 can interact with a simulated object 152 in a number of different ways, depending on a given simulation application.

Figure 5:
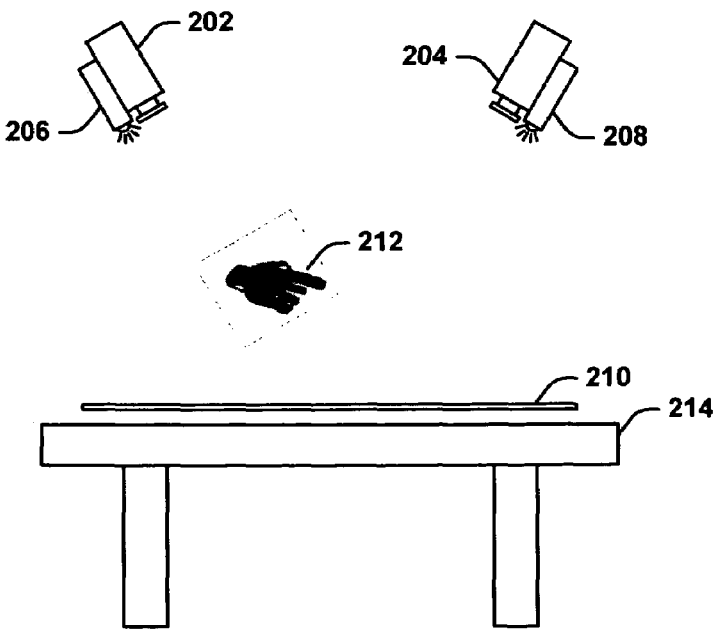
FIG. 5 illustrates an example of a gesture interface system in a gesture recognition simulation system in accordance with an aspect of the invention.

FIG. 5 illustrates an example of a gesture interface system 200 in accordance with an aspect of the invention. The gesture interface system 200 includes a first camera 202 and a second camera 204. Coupled to each of the first camera 202 and the second camera 204, respectively, is a first infrared (IR) light source 206 and a second IR light source 208. The first camera 202 and the second camera 204 may each include an IR filter, such that the respective camera may only be able to receive IR light. The first IR light source 206 and the second IR light source 208 each illuminate a retroreflective surface 210, such that IR light from the first IR light source 206 is reflected substantially directly back to the first camera 202 and IR light from the second IR light source 208 is reflected substantially directly back to the second camera 204. Accordingly, an object that is placed above the retroreflective surface 210 may reflect a significantly lesser amount of IR light back to each of the first camera 202 and the second camera 204, respectively. Therefore, such an object can appear to each of the first camera 202 and the second camera 204 as a silhouette image, such that it can appear as a substantially darker object in the foreground of the retroreflective surface 210.

A sensorless input object 212 can be used to provide input gestures over the retroreflective surface 210. In the example of FIG. 5, the sensorless input object 212 is demonstrated as a user's hand, such that the input gestures can be provided through hand gestures. It is to be understood that the use of a hand to provide input gestures via hand gestures is but one example implementation of the gesture interface system 200. For example, one or more users can provide input gestures concurrently, with one or more respective hands and/or tools. It is to be further understood that the sensorless input object 212 need not be specially designed or suited for use in the gesture interface system 200. For example, a user's naked hand or an ordinary tool could be used as the sensorless input object 212, and thus a user need not wear a glove that includes retroreflective material or one or more position sensors to provide input gestures to the gesture interface system 200 in accordance with an aspect of the invention.

In the example of FIG. 5, the first camera 202 and the second camera 204 each receive separate silhouette images of the sensorless input object 212, where each of the separate silhouette images received, respectively, by the first camera 202 and the second camera 204 are a matched pair. For example, each of the first camera 202 and the second camera 204 could rapidly take still photograph images at, for example, sixty times per second, such that each still photograph image taken by the first camera 202 is matched to a still photograph image taken by the second camera 204 at substantially the same time. The sensorless input object 212 can appear to be in a different location relative to the retroreflective surface 210 in each silhouette image matched pair captured by each of the first camera 202 and the second camera 204, respectively, due to parallax caused by the different mounted locations of each of the first camera 202 and the second camera 204.

The first camera 202 and the second camera 204 can each provide their respective separate silhouette images of the sensorless input object 212 to a simulation application controller (not shown), such as the simulation application controller 14 in the example of FIG. 1. Alternatively, the first camera 202 and the second camera 204 can each provide their respective separate silhouette images of the sensorless input object 212 to a dedicated controller, such that the dedicated controller of the gesture interface system 200 communicates with the simulation application controller. A dedicated controller could reside, for example, within a computer, or within one or more embedded processors of a given gesture recognition simulation system with which the gesture interface system 200 is being used. The respective silhouette images associated with the sensorless input object 212 can be processed to generate three-dimensional shape and physical location data associated with the sensorless input object 212.

For example, each of the first camera 202 and the second camera 204 could be mounted at a pre-determined angle relative to the retroreflective surface 210. For a given matched pair of images of the sensorless input object 212, if the pre-determined angle of each of the cameras 202 and 204 is equal, then each point of the sensorless input object 212 in two-dimensional space in a given image from the first camera 202 is equidistant from a corresponding point of the sensorless input object 212 in the respective matched image from the second camera 204. As such, the three-dimensional shape and physical location of the sensorless input object 212 can be determined based on a relative parallax separation of the matched pair of images of the sensorless input object 212 at a given time. In addition, using a computer algorithm, a three-dimensional physical location of end-points, such as fingertips, associated with the sensorless input object 212 can be determined, as will be described in greater detail in the example of FIG. 7 below.

The gesture interface system 200 can be configured such that it is integral with a three-dimensional display system (not shown), as will be discussed in greater detail in the examples of FIGS. 8 and 9 below. For example, the gesture interface system 200 can be configured at the location of a holograph projector or a three-dimensional display screen. As such, the gesture interface system 200 can interpret input gestures associated with the sensorless input object 212 that are performed directly on a three-dimensional image of a simulated object, as described above.

As will be apparent in the following discussion, the gesture interface system 200 in the example of FIG. 5 is intended to represent but one example of a gesture interface system in accordance with an aspect of the invention. For example, the gesture interface system 200 could include more than two cameras that each supply respective silhouette images of the sensorless input object 212 to the simulation application controller or dedicated controller. Additional cameras may provide better resolution for determining changes in shape of a given sensorless input object 212 for resolving a given input gesture. Cameras can also be mounted to point upward, for example, at a ceiling mounted retroreflective surface instead of, or in addition to, the cameras 202 and 204 and the retroreflective surface 220. In addition, the example of FIG. 5 demonstrates that the retroreflective surface 210 is mounted on a table 214. It is to be understood that such an arrangement is demonstrated for interaction with a simulated object that can be small enough to fit on the table 214. However, much larger gesture interface systems can be realized, such that an entire room can support a given simulation, with the floor of the room being the retroreflective surface. As a further example, the IR light sources 206 and 208 may not illuminate in the IR spectrum, but could instead illuminate in a different spectrum, such as narrow frequency bands of visible light, with each of the respective cameras 202 and 204 having a corresponding spectrum filter.

Figure 6:
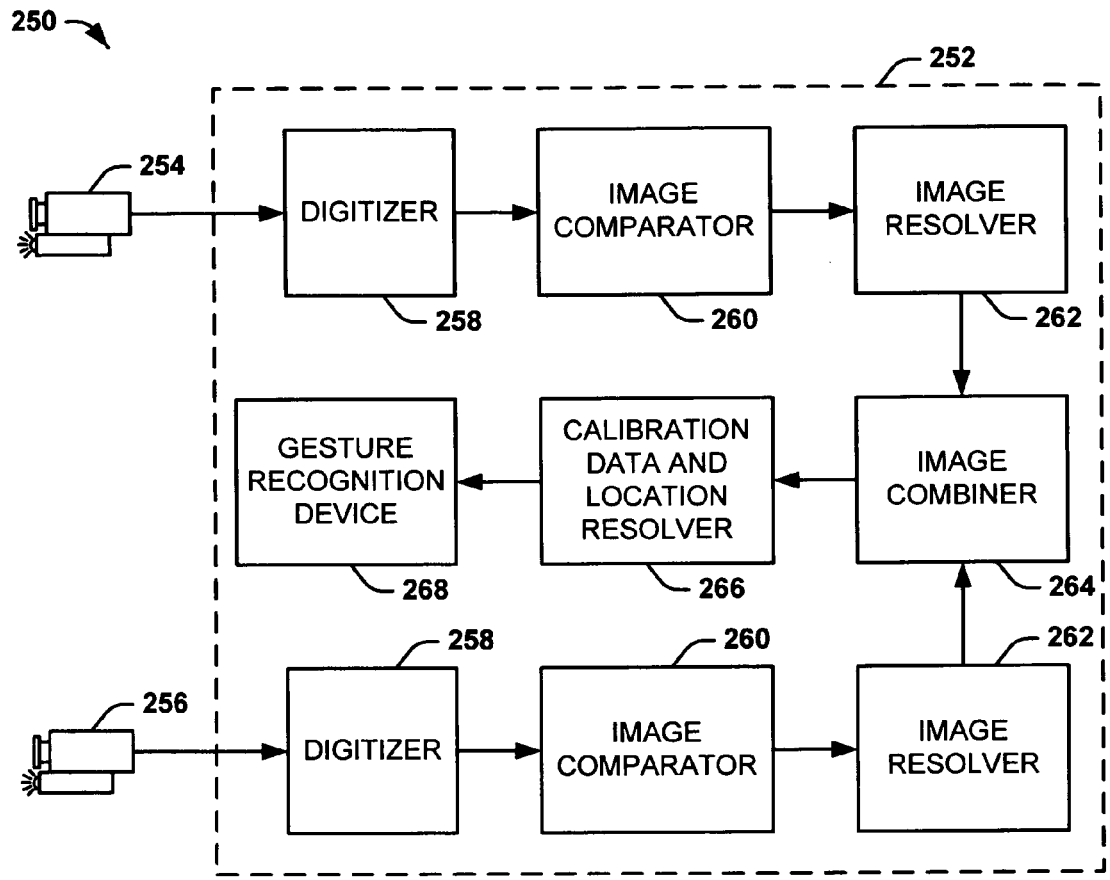
FIG. 6 illustrates an example of a gesture interface system in a gesture recognition simulation system in accordance with an aspect of the invention.

FIG. 6 illustrates another example of a gesture interface system 250 in accordance with an aspect of the invention. The gesture interface system 250 includes a controller 252. The controller 252 could be a portion of a simulation application controller, such as at least a portion of the gesture comparator 114 in the example of FIG. 3, or could be a dedicated controller. A first camera 254 and a second camera 256 each receive a plurality of images of a sensorless input object, such as one or more users' hands and/or tools. The respective images of the sensorless input object could be silhouette images generated from retroreflection of IR light off of a background surface.

The cameras 254 and 256 each input their respective images as a matched pair of images into a respective digitizer 258. The digitizer 258 produces digitized versions of the images of the sensorless input object. The digitized images of the sensorless input object are input to an image comparator 260. The image comparator 260 compares each of the digitized images of the sensorless input object to a previously stored digitized image of the sensorless input object to generate a binarized silhouette image of the sensorless input object. Such a comparison allows for an improved quality of the digitized images when the illumination of the background surface, such as IR illumination in the example of FIG. 5, is not uniform across the background surface. The previously stored digitized image could have been captured during a calibration operation and/or from repeatedly storing the digitized image in memory buffers.

As an example, a background model can be maintained for each of the cameras 254 and 256 without the sensorless input object being present. The background model images can be used to decide at each pixel whether the silhouette images of the sensorless input object correspond with a binary 1 or 0. In the above described example of the sensorless input object being a silhouette object in the foreground of an illuminated background, at each pixel location, if the sensorless input object silhouette image has a value that is approximately less than the corresponding background model image times a threshold scaling value of between 0 and 1, the output value will be a binary 1, thus denoting the presence of the sensorless input object. In this manner, the scaling value can be selected to provide an optimal balance between desirably detecting the sensorless input object while being substantially insensitive to residual shadows cast on the screen by an opposing source of illumination for the background surface.

The binarized silhouette images of the sensorless input object are then each input to an image resolver 262. The image resolver 262 can generate two-dimensional data regarding the shape of the sensorless input object. For example, the image resolver 262 can apply a mathematical algorithm to each of the digitized images of the sensorless input object to determine the presence of one or more features of a given sensorless input object, such as end-points. For example, the image resolver could determine the presence of fingertips and/or other features of a hand used as the sensorless input object. The image resolver 262 could employ a two-dimensional Laplacian of Gaussian convolution algorithm to determine the endpoints and/or other features for each of the respective plurality of images from the cameras 254 and 256. It is to be understood that the example of FIG. 6 is not limited to use of a two-dimensional Laplacian of Gaussian convolution algorithm, but that any of a variety of other spatial bandpass filtering can be used to determine the presence of the one or more end-points and/or other features of the sensorless input object. For example, a spatial filter that attenuates at least some of both high spatial frequency and low spatial frequency data content of a given digitized silhouette image can be used instead.

The image resolver 262 can be tuned to determine the presence and two-dimensional location of the one or more end-points of the sensorless input object based on an adjustable threshold of the image resolver 262. For example, the image resolver 262 could have a threshold set, such that regions of a given Laplacian of Gaussian convolved silhouette image that exceed the threshold can be determinative of a peak. The operation of the image resolver 262 to determine the one or more end-points of the sensorless input object will be described in greater detail in the example of FIG. 7. It is to be understood that, in the example of FIG. 6, any of a variety of other methods for endpoint and/or feature detection can be employed. For example, features can be detected through the use of a pattern matching algorithm that may scan a given silhouette image for one or more elongated finger shapes. The data output from each of the image resolvers 262 is input to an image combiner 264.

The image combiner 264 finds correspondence between the features detected by the first camera 254 and the features detected by the second camera 256. Various techniques can be employed to guide the correspondence process of the image combiner 264. For example, a calibration of the stereo optical geometry associated with the first camera 254 and the second camera 256 constrains the allowed position of the a given feature from the first camera 254 to a contour (i.e., epipolar line) on the image of the second camera 256. In addition, in the example of a user's hand being the sensorless input object, detected fingertips from each of the first and second cameras 254 and 256 can be organized into groups associated with the given user's hands. For example, the silhouette image that is output from each of the image comparators 260 can be used to determine connectivity of the detected fingertips to a common hand. The image combiner 264 can use the finger-to-hand association information to further guide the process of finding correspondences between fingertips from the images associated with the first camera 254 and the second camera 256.

Figure 7:
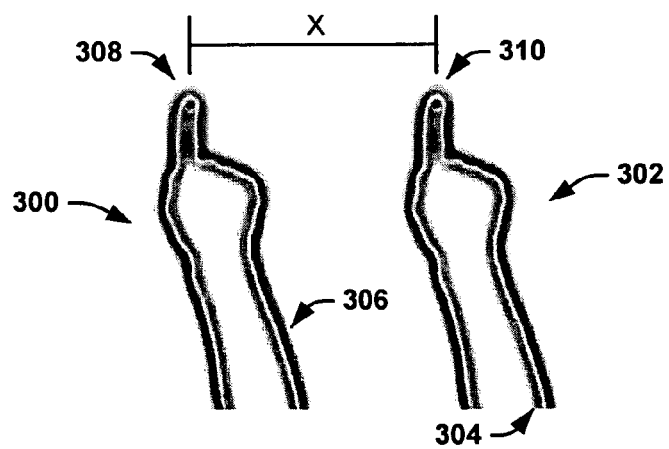
FIG. 7 illustrates an example of hand images for use in a gesture interface system in accordance with an aspect of the invention.

FIG. 7 demonstrates a composite image associated with the data output from the image combiner 264. Specifically, FIG. 7 illustrates a first image 300 and a second image 302 of a sensorless input object, demonstrated in the example of FIG. 7 as a user's hand. It is to be understood that the image combiner 264 may not actually construct the first image 300 and the second image 302, but that the images 300 and 302 are demonstrated for illustrative purposes. It is to be further understood that, in the discussion of FIG. 7, reference will be made to FIG. 6, but the example of FIG. 7 is not limited to the gesture interface system 250 of FIG. 6. The first image 300 could have been received by the first camera 254 and the second image 302 could have been received by the second camera 256. The first image 300 and the second image 302 could have been received as silhouette images by each of the respective cameras 254 and 256. Due to parallax caused by the separate locations of the cameras 254 and 256, the first image 300 and the second image 302 are demonstrated in the example of FIG. 7 as spaced apart from each other by a distance X.

In the example of FIG. 7, the first image 300 and the second image 302 have each been illustrated as having undergone a two-dimensional Laplacian of Gaussian convolution filtering and feature detection operation. Accordingly, each of the first image 300 and the second image 302 appear as they would after being output from the respective image resolver 262. The resultant data output from the image resolvers 262 appears as positive and negative value pixels. The positive value pixels appear at the edges of space occupied by the user's hand, demonstrated by the lightly shaded portion 304. The negative value pixels appear at the edges of space not occupied by the user's hand, demonstrated by the darker shaded portion 306.

A brief description of the two-dimensional Laplacian of Gaussian convolution filtering operation follows. The data output from the filters 262 is achieved first by a Gaussian convolution operation, such that the pixels of the user's hand undergo an averaging distribution. The result of the Gaussian operation is such that the image of the user's hand appears blurred at the edge. A Laplacian operation is then performed on the Gaussian image, such that the pixels of the user's hand undergo a two-dimensional second derivative operation. The result of the Laplacian operation is such that the two-dimensional edge boundary of the user's hand and the surrounding space is clearly defined. When the two operations are combined, positive and negative convolution data can be ascertained, for example, resulting in the positive value pixels of the lightly shaded portion 304 and the negative value pixels of the darker shaded portion 306. It is to be understood that the polarity of the pixels could be the opposite, resulting in negative value pixels of the lightly shaded portion 304 and positive value pixels of the darker shaded portion 306, depending on the image polarity. It is to be further understood that the two-dimensional Laplacian of Gaussian convolution operation can be performed in a variety of different manners, such as, for example, by reversing the procedure to perform the Laplacian operation first. Furthermore, the two-dimensional Laplacian of Gaussian convolution filtering operation can be tuned to increase or decrease the size of the distribution of the shaded portions 304 and 306.

The positive and negative convolution data can be interpreted by the image resolver 262 to determine the presence of one or more end-points and/or other features. In the example of FIG. 7, the detected features are fingertips 308 and 310. For example, the image resolver 262 could determine the presence of a fingertip in the example of FIG. 7 by evaluating the distribution of the positive value pixels in the lightly shaded portion 304. If the two-dimensional Laplacian of Gaussian convolution filtering operation is tuned to provide positive value pixels for the entirety of a user's finger, for example, then the image resolver 262 can ascertain dimensional information associated with the user's finger. From the dimensional information, the peak detector can determine the two-dimensional location of the fingertips 308 and 310. In addition, upon determining the two-dimensional location of the fingertips 308 and 310, the image resolver 262 can also ascertain dimensional information regarding the fingers themselves. For example, the image resolver 262 may be programmed to determine thickness, length, and orientation of a given elongated region that includes the end-point of a given sensorless input object, such as the fingers that include the detected fingertips.

As an example, using the orientation of the one or more fingers can allow a gesture to be recognized by the gesture interface system 250 that is based merely on a given user pointing at the simulated object, such that the user's extended finger can behave as, for example, a laser pointer. As another example, determining dimensional information of the fingers could allow the gesture interface system 250 to recognize which of the user's fingers belong to which hand, such that, for example, a variety of two-handed gestures can be employed in operating the gesture interface system 250. In addition, further analysis of the silhouette information in the vicinity of the fingertips allows the gesture interface system 250 to recognize which fingers belong to the same hand and which hands are likely to belong to any one user of a group of users based on the position and direction of the arm silhouettes extending from each hand. For example, multiple simultaneous inputs can be recognized defining either separate gestures on a per user basis or collaborative gestures where multiple user input is required to define a single gesture.

Referring back to FIG. 6, the composite images output from the image combiner 264 are input to a calibration data and location resolver 266. The calibration data and location resolver 266 determines a three-dimensional location of the sensorless input object and associated features at a given time. For example, the example of FIG. 7 demonstrates that the fingertips of the respective images 300 and 302 of the user's hand are spaced apart by a distance X. If, for example, the cameras 254 and 256 are mounted at an equal angle relative to the background surface, the fingertip of the user's hand occupies a point that is approximately located in two-dimensional space at X/2 along a line that intersects the fingertips 308 and 310. However, differing values of X denote changes in height associated with the user's fingertip relative to the background surface. For example, as X increases, the user's hand is moving further away from the background surface. As X decreases, the user's hand is moving closer to the background surface. Therefore, the calibration data and location resolver 266 interpolates the three-dimensional location of the sensorless input object and associated features based on parallax separation. The gesture interface system 250 can be calibrated to know which values of X correspond to the height of the user's fingertip relative to the background surface, such that a given value of X could correspond to a height of zero, thus denoting a touch of the user's fingertip to the background surface.

The data output from the calibration data and location resolver 266 is input to a gesture recognition device 268. The gesture recognition device 268 interprets the three-dimensional location data associated with the sensorless input object and associated features and translates changes in the location data into an input gesture. Because the gesture recognition device 628 implements the location data associated with the sensorless input object, it can be programmed to recognize any of a variety of gestures that utilize changes in three-dimensional shape and/or physical location of the sensorless input object and/or associated features. The gesture recognition device 268 can also be programmed to recognize gestures from multiple users simultaneously, as described above. In addition, the gesture recognition device 268 can also evaluate not only changes in the three-dimensional shape and/or physical location of the sensorless input object, but also a time threshold associated with its motion. Moreover, any of a variety of input gestures could be formed from six-degree of freedom motion based on changes in three-dimensional location and orientation of the sensorless input object and any associated features.

It is to be understood that a given gesture recognition interface system is not intended to be limited by the example of FIGS. 5-7. Other implementations are possible for providing inputs in accordance with an aspect of the invention. For example, one or more of the devices in the controller 252 could be integral with other devices, or could be separate from the controller 252. For example, the cameras 254 and 256 could each input their respective images to a common digitizer 258. Furthermore, the image resolvers 262 are but one way to determine the features of the sensorless input object, and that other algorithms may be employed in place of a two-dimensional Laplacian of Gaussian convolution filtering operation. For example, a three-dimensional rendering of the sensorless input object can be achieved by combining each image from each camera, and comparing the motions with the predefined gestures. Accordingly, the example of FIGS. 5-7 is but one of a variety of ways of providing input gestures in accordance with an aspect of the invention.

Figure 8:
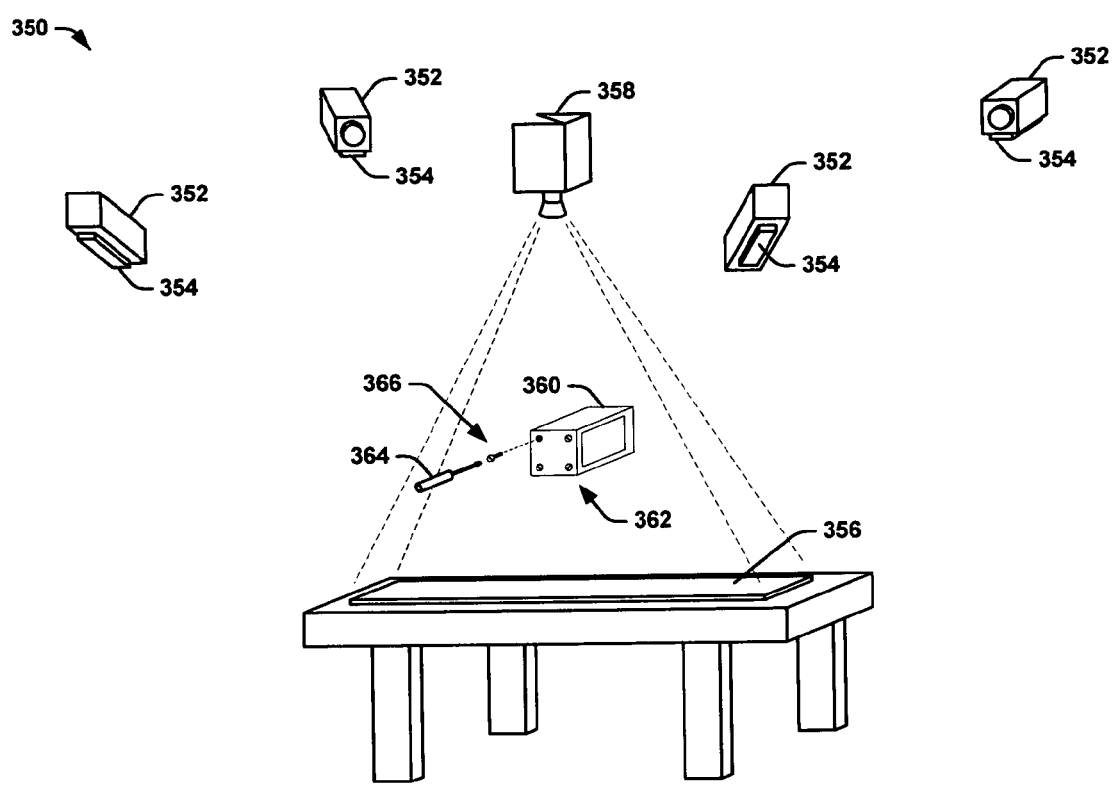
FIG. 8 illustrates an example of a gesture recognition simulation system in accordance with an aspect of the invention.

FIG. 8 illustrates an example of a gesture recognition simulation system 350 in accordance with an aspect of the invention. The gesture recognition simulation system 350 includes four cameras 352, each of which includes a respective IR light source 354. The cameras 352 may each include an IR filter, such that each of the respective cameras 352 may only be able to receive IR light. The IR light sources 354 each illuminate a retroreflective surface 356, such that IR light from the IR light sources 354 is reflected substantially directly back to the respective one of the cameras 352. Accordingly, the cameras 352, IR light sources 354, and retroreflective surface 356 collectively form a gesture interface system, such as the gesture interface system 200 in the example of FIG. 5.

The gesture recognition simulation system 350 includes a three-dimensional display system 358, demonstrated in the example of FIG. 8 as a holograph projector. In the example of FIG. 8, the three-dimensional display system 358 projects a holographic image of a simulated object 360. The three-dimensional display system 358 is demonstrated in the example of FIG. 8 as being mounted directly above the retroreflective surface 356, such that the holographic image of the simulated object 360 is located at the gesture interface system formed by the cameras 352, IR light sources 354, and retroreflective surface 356. Accordingly, a user can provide input gestures to interact directly with the holographic image of the simulated object 360. In addition, the holographic image of the simulated object 360 can include a plurality of functional components 362, demonstrated in the example of FIG. 8 as screws attached to an end of the simulated object 360.

A sensorless input object 364 can be used to provide input gestures over the retroreflective surface 356. To provide the interaction between the sensorless input object 364 and the given functional component 362, a simulation application controller (not shown) can detect a three-dimensional physical location of a feature of the sensorless input object 364. For example, the simulation application controller could utilize the gesture interface system formed by the cameras 352, IR light sources 354, and retroreflective surface 356 to determine the three-dimensional physical location of a feature of the sensorless input object 364. Upon determining a correlation of the physical locations of the sensorless input object 364 and a given functional component 362, the simulation application controller can determine a gesture motion associated with the sensorless input object to determine if it corresponds with a predefined action associated with the functional component. Upon determining that the input gesture corresponds with the predefined action, the simulation application controller commands the three-dimensional display system 358 to output the appropriate simulated action.

In the example of FIG. 8, the sensorless input object 364 is demonstrated as a screwdriver. The simulation application controller could utilize the gesture interface system formed by the cameras 352, IR light sources 354, and retroreflective surface 356 to determine the three-dimensional physical location of the end-point of the screwdriver 364. FIG. 8 demonstrates that the screwdriver 364 is being used to interact with one of the functional components 362, a screw 366. The simulation application controller can compare the three-dimensional location of the end-point of the screwdriver 364 with the location of the screw 366. Upon determining a correlation of the physical locations of the end-point of the screwdriver 364 and the screw 366, the simulation application controller can determine a gesture motion associated with the screwdriver 364 to determine if it corresponds with a predefined action associated with the functional component. As the user may be providing an unscrewing gesture, the simulation application controller commands the three-dimensional display system 358 to output the appropriate simulated action, which in the example of FIG. 8, is the screw 366 being unscrewed and removed from the simulated object 360.

The example of FIG. 8 is provided to demonstrate one possible simulation that can be utilized by the gesture recognition simulation system 350. As described above in the examples of FIGS. 1-4, a variety of other simulations can be achieved in accordance with an aspect of the invention. As such, the gesture recognition simulation system 350 is not intended to be limited to the example of FIG. 8.

Figure 9:
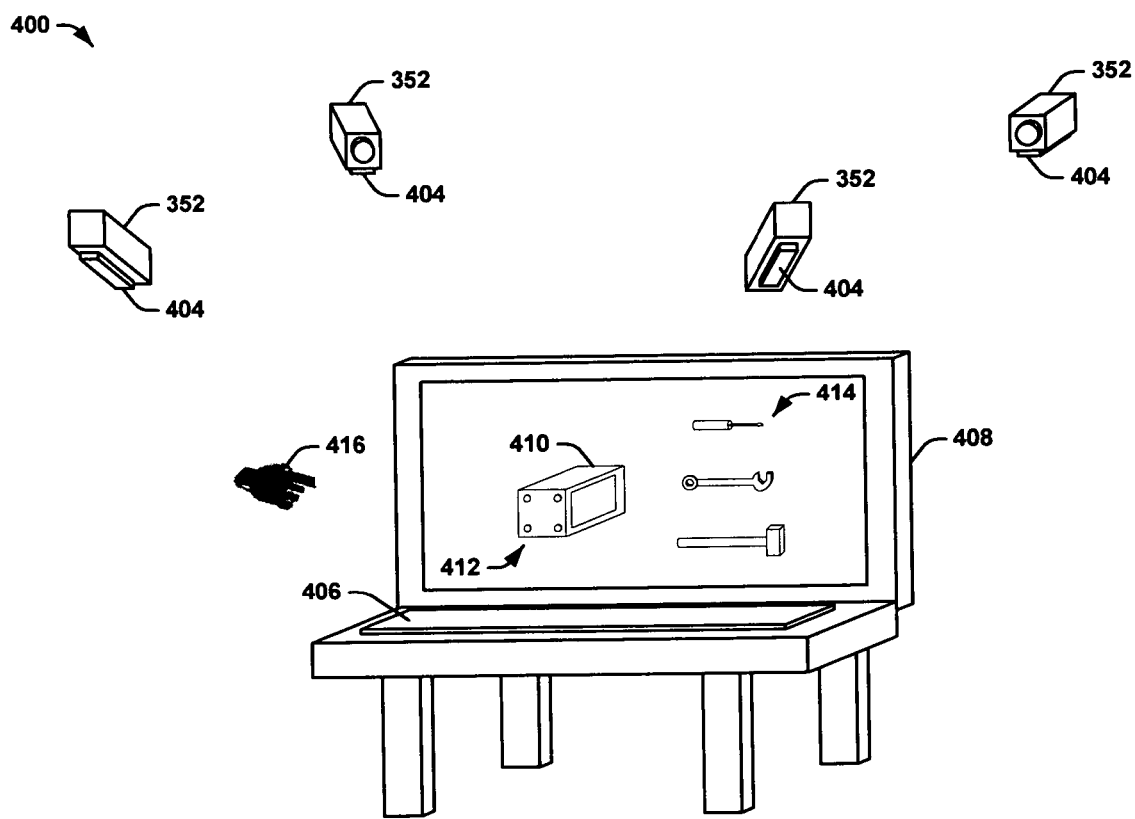
FIG. 9 illustrates another example of a gesture recognition simulation system in accordance with an aspect of the invention.

FIG. 9 illustrates another example of a gesture recognition simulation system 400 in accordance with an aspect of the invention. The gesture recognition simulation system 400 includes four cameras 402, each of which includes a respective IR light source 404. The cameras 402 may each include an IR filter, such that each of the respective cameras 402 may only be able to receive IR light. The IR light sources 404 each illuminate a retroreflective surface 406, such that IR light from the IR light sources 404 is reflected substantially directly back to the respective one of the cameras 402. Accordingly, the cameras 402, IR light sources 404, and retroreflective surface 406 collectively form a gesture interface system, such as the gesture interface system 200 in the example of FIG. 5.

The gesture recognition simulation system 400 includes a three-dimensional display system 408, demonstrated in the example of FIG. 9 as a three-dimensional display screen. In the example of FIG. 9, the three-dimensional display system 408 displays a three-dimensional image of a simulated object 410. For example, the three-dimensional display system 408 in the example of FIG. 9 could require a user to wear special glasses or goggles to be able to view the simulated object 410 in three-dimensions. The three-dimensional display system 408 is demonstrated in the example of FIG. 9 as being mounted next to the retroreflective surface 406, such that the display of the simulated object 410 is located at the gesture interface system formed by the cameras 402, IR light sources 404, and retroreflective surface 406. Accordingly, a user can provide input gestures to interact directly with the display of the simulated object 410. In addition, the display of the simulated object 410 can include a plurality of functional components 412.

The three-dimensional display system 408 can also be configured to display a plurality of simulated tools 414. In the example of FIG. 9, the simulated tools 414 are demonstrated as a screwdriver, a wrench, and a hammer. A user's hand 416 can be used as a sensorless input object to provide input gestures over the retroreflective surface 406. In the example of FIG. 9, the input gestures that can be provided to the gesture recognition simulation system 400 can include grabbing and manipulating the simulated tools 414, such that the simulated tools 414 can also act as functional components that are reactive to the user's hand 416.

For example, a simulation application controller (not shown) can detect a three-dimensional physical location of the user's hand 416 using the gesture interface system formed by the cameras 402, IR light sources 404, and retroreflective surface 406. Upon determining a correlation of the physical locations of the user's hand 416 and a given one of the simulated tools 414, the simulation application controller can determine a gesture motion associated with the sensorless input object to determine if it corresponds with a predefined action, such as grabbing the given simulated tool 414. Upon grabbing the simulated tool 414, the simulation application controller could determine input gestures using the user's hand 416 that incorporate the simulated tool 414. For example, a wrist-turning motion of the user's hand 416 while manipulating the simulated screwdriver 414 could be interpreted as an unscrewing gesture, such as described above in the example of FIG. 8.

The simulation application controller could determine orientation of the simulated tool 414 based on the input gestures associated with the user's hand 416, such that the simulation application controller could determine a three-dimensional physical location of an end-point of the simulated tool 414. Therefore, the simulation application controller can compare the three-dimensional location of the end-point of the simulated tool 414 with the location of a given functional component 412. Accordingly, the simulated tool 414 can act as a sensorless input object as an extension of input gestures that are provided using the user's hand 416.

The example of FIG. 9 is provided to demonstrate one possible simulation that can be utilized by the gesture recognition simulation system 400. As described above in the examples of FIGS. 1-4, a variety of other simulations can be achieved in accordance with an aspect of the invention. As such, the gesture recognition simulation system 400 is not intended to be limited to the example of FIG. 9.

Figure 10:
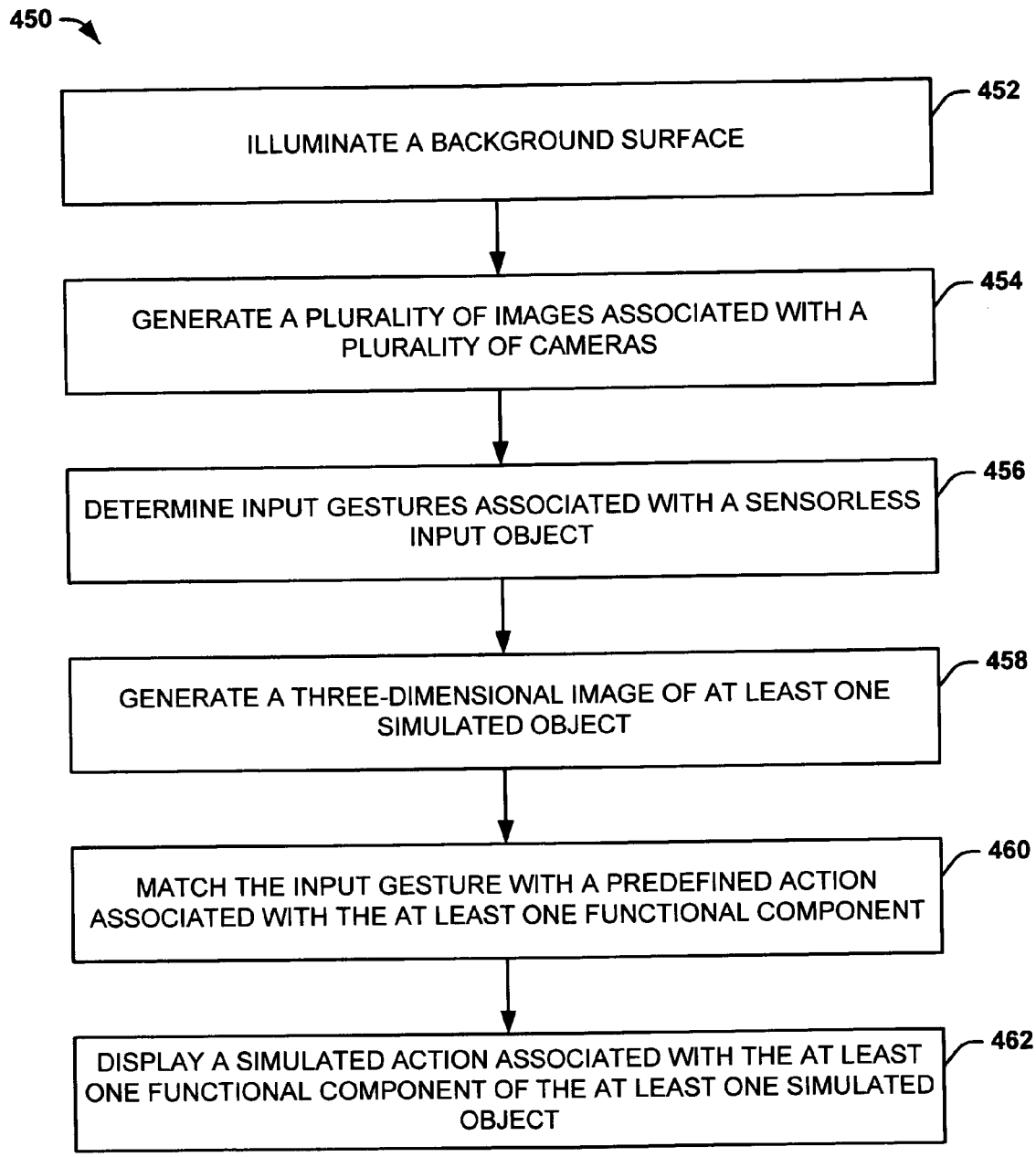
FIG. 10 illustrates an example of a method for gesture recognition simulation in accordance with an aspect of the invention.

In view of the foregoing structural and functional features described above, a methodology in accordance with various aspects of the present invention will be better appreciated with reference to FIG. 10. While, for purposes of simplicity of explanation, the methodologies of FIG. 10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 10 illustrates an example of a method 450 for gesture recognition simulation in accordance with an aspect of the invention. At 452, a background surface is illuminated. The illumination could be provided by IR light sources, and the background surface could be retroreflective. At 454, a plurality of images associated with a plurality of cameras are generated. The plurality of cameras could include IR filters, such that the plurality of cameras can only detect light in the IR spectrum. The plurality of images could be based on a reflected light contrast between a sensorless input object and the background surface. The sensorless input object could be a user's hand, a tool, or multiple hands and/or tools from the same or multiple users. At 456, input gestures associated with the sensorless input object are determined. The determination of the input gesture could be based on changes in three-dimensional shape and/or physical location associated with the sensorless input object.

At 458, a three-dimensional image of at least one simulated object is generated. The at least one simulated object can have at least one functional component with which a user can interact. The three-dimensional image of the at least one simulated object could be generated from holograph projector or could be displayed on a three-dimensional display screen, such that a user can use goggles or glasses to view the three-dimensional simulated object. At 460, the input gesture is matched with a predefined action associated with at least one functional component. The matching can occur through a simulation application controller comparing relative locations of the functional component and the sensorless input object in three-dimensional space. Upon determining that the locations match, the simulation application controller could determine whether the gesture motion component of the input gesture corresponds to one of the predefined actions associated with the functional component. At 462, a simulated action associated with the predefined action is displayed on the functional component of the simulated object. The simulated action can be displayed as occurring while the input gesture occurs.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A gesture recognition simulation system comprising:
   a three-dimensional display system that displays a three-dimensional image of at least one simulated object, the three-dimensional image appearing to occupy three-dimensional space to a user and having at least one functional component that is a portion of the three-dimensional image of the at least one simulated object which is reactive to interaction by the user independent of remaining portions of the three-dimensional image of the at least one simulated object;
   a gesture recognition interface system configured to receive an input gesture associated with a sensorless input object from the user, the input gesture being determined by changes in at least one of a three-dimensional shape and a physical location of the sensorless input object relative to a physical location of the at least one functional component in three-dimensional space; and
   a simulation application controller configured to match a given input gesture with a predefined action associated with the at least one functional component, and invoke the three-dimensional display system to display a simulated action associated with the predefined action on at least a portion of the at least one simulated object associated with the at least one functional component.

2. The system of claim 1, wherein the gesture recognition interface system comprises:
   a plurality of light sources positioned to illuminate a background surface; and
   at least one camera configured to receive a first plurality of images based on a first reflected light contrast difference between the background surface and the sensorless input object caused by a first of the plurality of light sources and a second plurality of images based on a second reflected light contrast difference between the background surface and the sensorless input object caused by a second of the plurality of light sources, such that the three-dimensional shape and the physical location of the sensorless input object are determined based on a comparison of shape and location of corresponding images of the first plurality of images and the second plurality of images.

3. The system of claim 2, wherein the plurality of light sources are infrared (IR) light sources, such that the at least one camera comprises an IR filter.

4. The system of claim 1, further comprising a gesture library that stores a plurality of predefined gestures, the simulation application controller employs the gesture library to determine if a given input gesture matches a predefined action.

5. The system of claim 1, further comprising an object library, accessible by the simulation application controller, that stores data associated with a plurality of simulated objects including three-dimensional image information, information associated with at least one functional component of the respective simulated object, and at least one predefined action associated with the at least one functional component.

6. The system of claim 5, wherein the object library is further configured to store at least one predefined gesture for a given predefined action.

7. The system of claim 1, wherein the three-dimensional display system is further configured to display a three-dimensional image of at least one simulated tool that is reactive to a user's hand, such that the sensorless input object comprises the user's hand and the at least one simulated tool.

8. The system of claim 1, wherein the at least one sensorless input object comprises at least one of both hands of a user, at least one hand from multiple users, and at least one tool held by one or more users.

9. The system of claim 1, wherein the three-dimensional display system is a holograph projector, such that the three-dimensional image of the at least one simulated device is a holographic image.

10. The system of claim 1, wherein the input gesture comprises concurrent gestures associated with a plurality of users.

11. The system of claim 1, wherein the simulated action comprises one of removing, moving and assembling at least a portion of the at least one simulated object associated with the at least one functional component.

12. The system of claim 1, further comprising an output system configured to provide an additional output in response to the simulated action, the output being at least one of an audio signal, a video signal, and a control signal.

13. The system of claim 1, wherein the input gesture comprises pointing with a finger to define a one-dimensional ray in three-dimensional space, such that multiple pointed fingers define a plurality of one-dimensional rays in three-dimensional space that further define an input gesture based on a geometric shape in three-dimensional space.

14. A method of interacting with a simulated device, the method comprising:
   generating a three-dimensional image of at least one simulated object the three-dimensional image appearing to occupy three-dimensional space to a user and having at least one functional component that is a portion of the three-dimensional image of the at least one simulated object which is reactive to interaction by a user independent of remaining portions of the three-dimensional image of the at least one simulated object;
   illuminating a background surface with a plurality of light sources;
   generating a first plurality of images associated with a sensorless input object based on a reflected light contrast between the sensorless input object and the illuminated background surface caused by one of the plurality of light sources;
generating a second plurality of images associated with the sensorless input object based on a reflected light contrast between the sensorless input object and the illuminated background surface caused by another one of the plurality of light sources;
determining changes in at least one of a three-dimensional shape and a physical location of the sensorless input object based on a comparison of corresponding images of the first and second plurality of images;
determining an input gesture associated with the sensorless input object based on the changes in at least one of a three-dimensional shape and a physical location of the sensorless input object relative to a physical location of the at least one functional component in three-dimensional space;
determining if the input gesture matches a predefined action associated with the at least one functional component; and
displaying a simulated action associated with a matched predefined action on at least a portion of the at least one simulated object associated with the at least one functional component.

15. The method of claim 14, wherein illuminating the background surface comprises illuminating the background surface with a plurality of infrared (IR) light sources.

16. The method of claim 14, further comprising comparing the determined input gesture with a plurality of predefined gestures stored in a predefined gesture library, each predefined action of the at least one functional component having at least one associated gesture of the plurality of predefined gestures that initiates a simulated action on at least a portion of the at least one simulated object.

17. The method of claim 14, further comprising accessing an object library configured to store data associated with a plurality of simulated objects, the data for each of the plurality of simulated objects including three-dimensional image information, information associated with at least one functional component of the respective simulated object, and at least one predefined action associated the at least one functional component.

18. The method of claim 14, further comprising generating a three-dimensional image of at least one simulated tool, the three-dimensional image of the at least one simulated tool being reactive to a user's hand, such that the simulated action is in response to gestures that are performed both with the user's hand and with the at least one simulated tool.

19. The method of claim 14, wherein determining the input gesture associated with the sensorless input object comprises determining an input gesture associated with at least one of both hands of a user, at least one hand from multiple users, and at least one tool held by one or more users.

20. The method of claim 14, wherein generating the three-dimensional image of the at least one simulated object comprises projecting a three-dimensional holographic image of the at least one simulated object.

21. The method of claim 14, wherein determining the input gesture associated with the sensorless input object comprises determining concurrent input gestures associated with a plurality of users.

22. The method of claim 14, further comprising activating at least one additional output in response to the simulated action, the at least one additional output being at least one of an audio signal, a video signal, and a control signal.

23. The method of claim 14, wherein the simulated action comprises one of removing, moving and assembling at least a portion of the at least one simulated object.

24. A gesture recognition simulation system comprising:
means for displaying a three-dimensional image of at least one simulated object, the three-dimensional image appearing to occupy three-dimensional space to a user and having at least one functional component that is a portion of the three-dimensional image of the at least one simulated object which is reactive to interaction by a user independent of remaining portions of the three-dimensional image of the at least one simulated object;
means for generating a first plurality of images associated with a sensorless input object based on a reflected light contrast between the sensorless input object and an illuminated background surface caused by a first light source;
means for generating a second plurality of images associated with the sensorless input object based on a reflected light contrast between the sensorless input object and the illuminated background surface caused by a second light source;
means for determining changes in at least one of a three-dimensional shape and a physical location of the sensorless input object based on a comparison of corresponding images of the first and second plurality of images;
means for determining an input gesture associated with the sensorless input object based on the determined changes;
means for matching the input gesture to a predefined action associated with the at least one functional component and a physical location of the input gesture relative to a physical location of the at least one functional component in three-dimensional space; and
means for displaying a simulated action on at least a portion of the at least one simulated object, the simulated action being associated with the matching of a predefined action to an associated input gesture.

25. The system of claim 24, further comprising means for storing a plurality of predefined gestures, the means for matching employing the means for storing to match the input gesture to the predefined action.

26. The system of claim 24, further comprising means for storing data associated with a plurality of simulated objects, the data for each of the plurality of simulated objects including three-dimensional image information, information associated with at least one functional component of the respective simulated object, and at least one predefined action associated with each of the at least one functional component.

27. The system of claim 24, wherein the sensorless input object comprises at least one of both hands of a user, at least one hand from multiple users, and at least one tool held by one or more users.

* * * * *